United States Patent [19]

Rockower

[11] Patent Number: 4,881,567

[45] Date of Patent: Nov. 21, 1989

[54] LIQUID REMOVAL SYSTEM

[75] Inventor: Gerald Rockower, Brooklyn, N.Y.

[73] Assignee: Brooklyn Union Gas, Brooklyn, N.Y.

[21] Appl. No.: 127,396

[22] Filed: Dec. 2, 1987

[51] Int. Cl.[4] ............................................. F17T 1/00
[52] U.S. Cl. .................................. 137/203; 138/118
[58] Field of Search ..................... 138/109, 118, 121; 134/167 C, 166 C, 168 C; 137/317, 203

[56] References Cited

U.S. PATENT DOCUMENTS

| | | | |
|---|---|---|---|
| 1,191,013 | 7/1916 | McGiluray | 137/203 |
| 2,650,497 | 9/1953 | Renwanz | 73/212 |
| 2,998,028 | 8/1961 | Rohde | 138/109 |
| 3,370,599 | 10/1965 | Ciaccio | 134/167 |
| 3,402,741 | 9/1968 | Yurdin | 138/118 |
| 3,756,266 | 9/1973 | Artz | 137/203 |
| 3,930,413 | 1/1976 | Laird | 137/317 |
| 4,307,754 | 12/1981 | Muratsubaki | 138/121 X |
| 4,345,613 | 8/1982 | Mills | 137/317 |
| 4,456,034 | 1/1984 | Bixby | 138/138 X |
| 4,669,508 | 6/1987 | Neaves | 138/121 |
| 4,682,623 | 7/1987 | Scherer | 137/317 |

FOREIGN PATENT DOCUMENTS 482200  8/1977  United Kingdom ................ 137/317

Primary Examiner—Alan Cohan
Attorney, Agent, or Firm—Fitzpatrick, Cella Harper & Scinto

[57] ABSTRACT

A liquid removal system particularly adapted to remove water from a gas main. The system includes the combination of highly flexible, low-friction tube fitted with an internal stainless steel stiffener, this assembly having a weighted nose guide to ensure that the assembly remains at the bottom of the gas main. The assembly is inserted into the gas main through a tap hole using an insertion guide to ensure that the assembly is inserted at a proper angle into the gas main.

41 Claims, 3 Drawing Sheets

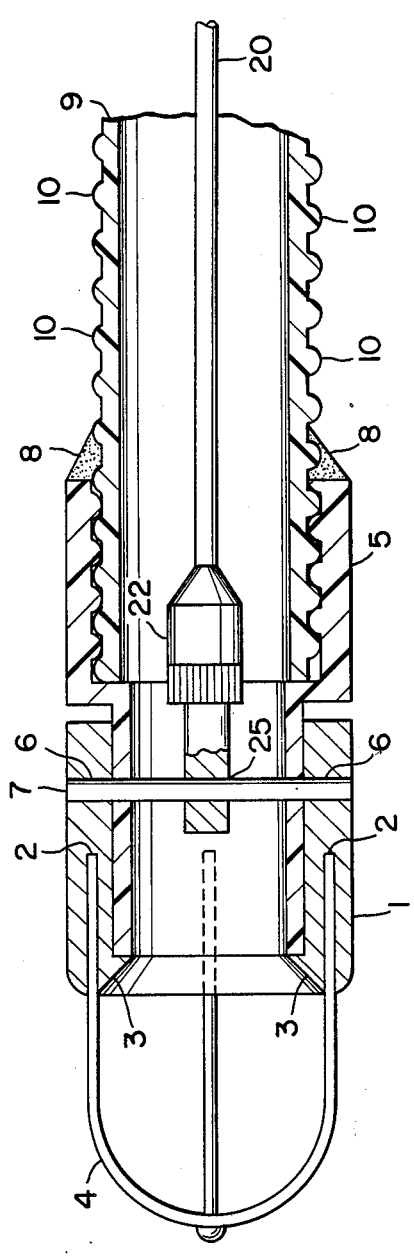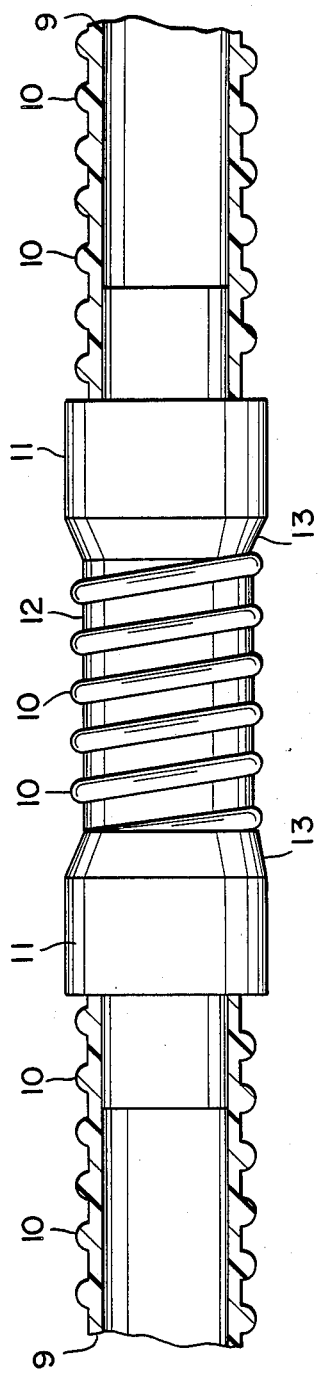

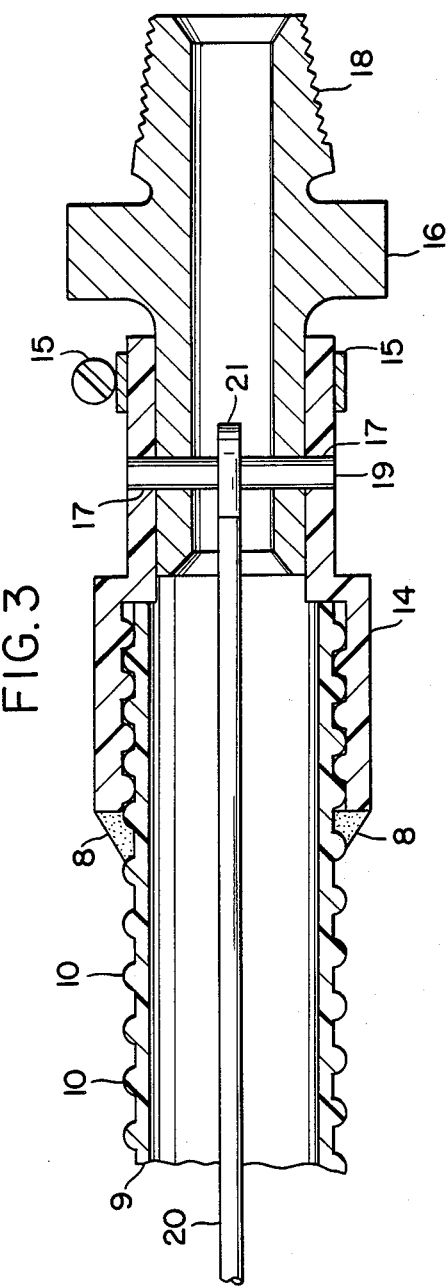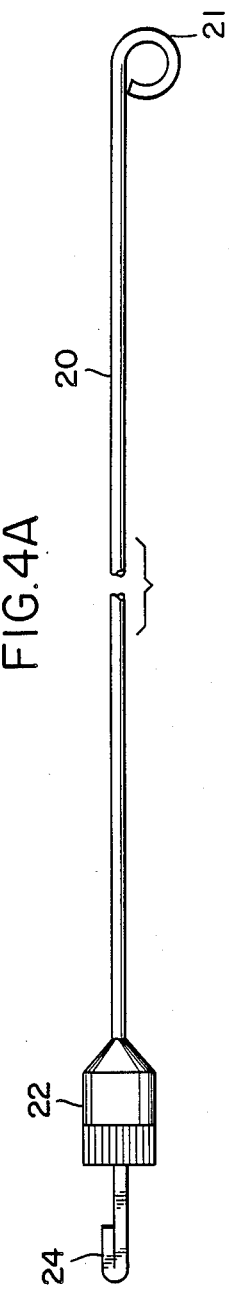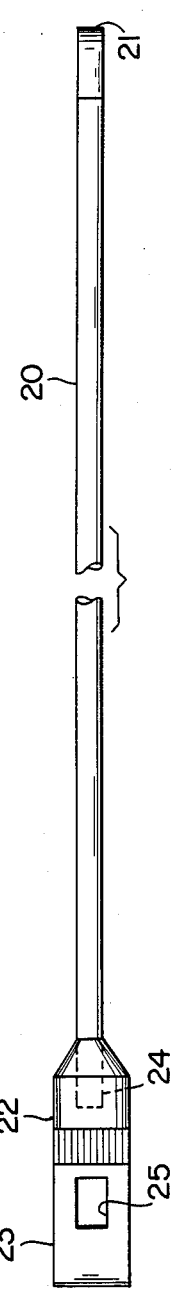

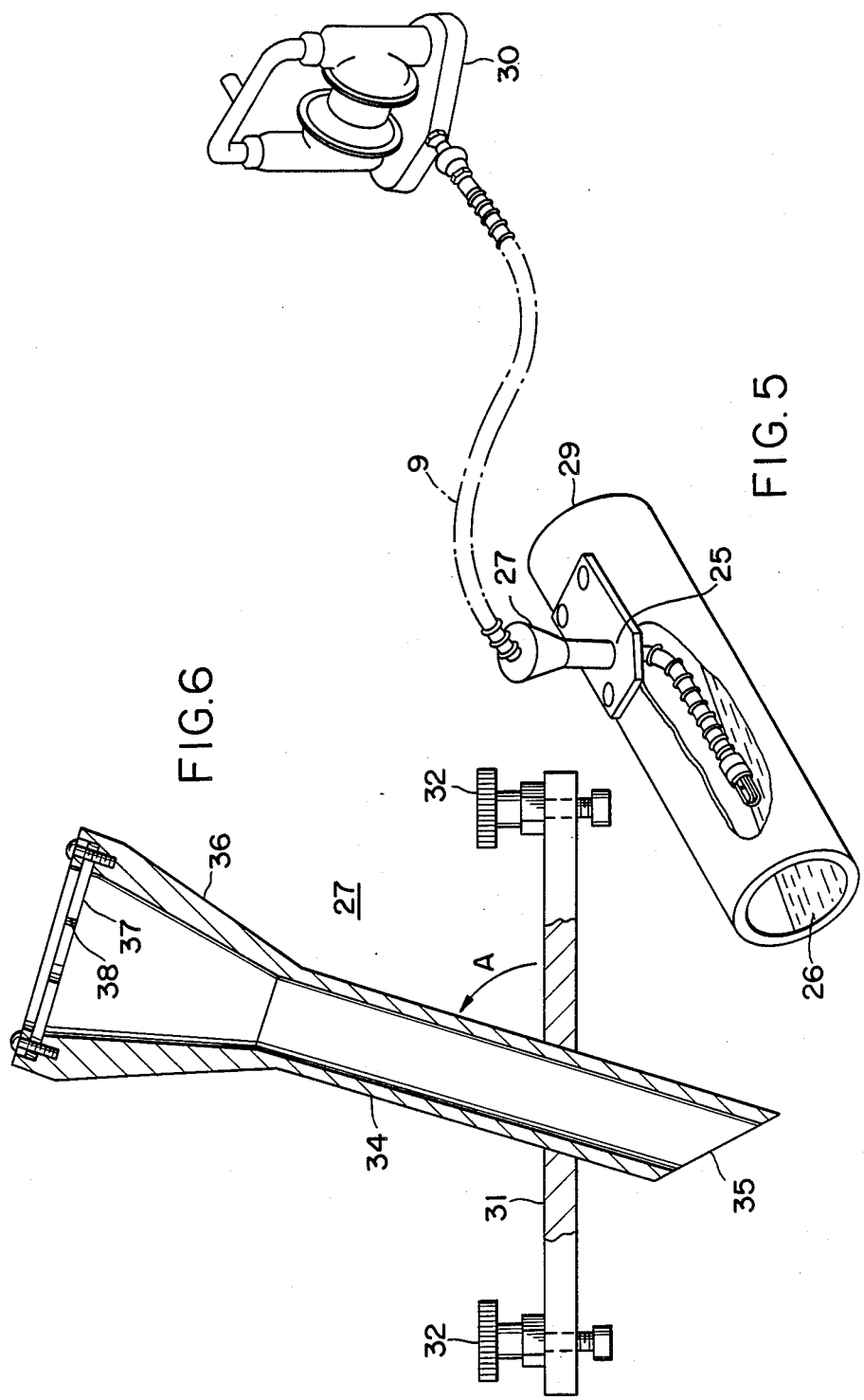

LIQUID REMOVAL SYSTEM

BACKGROUND

1. Field of the Invention

The present invention pertains to a liquid removal system for removing liquids from within a second object, and particularly to a system for removing water from the interior of a gas main.

2. Description of the Related Art

It is frequently desired to remove waste liquids from the interior of a container or conduit. For example, in a gas pipeline, water often collects at low points in the pipeline. The water may have been introduced by damage to an adjacent water main, or may have been introduced by rehydration of water vapor within the natural gas. Regardless of the method of introduction, the presence of water is undesired since it can prevent the flow of the gas product through the pipeline. The flow of gas is particularly restricted during winter months when the water freezes.

It is, accordingly, necessary to remove the water from time to time. Preferably, the water would be removed without disconnecting the gas service. Moreover, in the case where the gas main has been buried, the number of excavation sites should be minimized.

It has hitherto been suggested to remove water from the gas main by snaking a secondary pipe through the gas main to low points in the main where water has collected. Thus, U.S. Pat. No. 3,756,266 suggests a system wherein a pipe of diameter smaller than that of the gas main is fed to the low point in the gas main. Water within the gas main is forced through minute holes placed longitudinally in the pipe by pressure of the gas in the gas main. Water is propelled through the small pipe and subsequently expelled at the opposite end thereof. Caster assemblies are provided at intervals on the small pipe to allow the pipe to be positioned easily within the gas main.

However, the device in the the above-described patent illustrates the shortcomings of prior art techniques for water removal. These techniques typically utilize a single element to perform both the water removal function and the snaking function. Requiring a single element to perform two functions places on this element the inconsistent constraints of being at once flexible enough to snake around interior bends in the gas main, yet stiff enough to be propelled through the main. In fact, in the above-described patent, snaking is impossible due to the rigidity of the inserted pipe. Accordingly, prior art techniques are unsuitable for most water removal applications, and particularly unsuitable for those applications where the gas main is buried within city streets and consequently includes a multitude of bends.

SUMMARY

I have conceived and contribute by my invention an apparatus which overcomes the disadvantages heretofore found in the art.

In one aspect, my invention achieves its objects by the provision of two elements specifically selected to perform that function to which each is ideally suited. Thus, a flexible tube is used to snake through a gas main and to pump water from the main. An internal stiffener is fitted within this tube and used to provide longitudinal rigidity to the assembly without substantially affecting the flexibility of the assembly. This allows the assembly to be propelled through the gas main. The tube is advantageously formed of a friction reducing material to allow the tube easily to be propelled through the gas main around the bends therein. Additionally, the forward end of the assembly may be provided with a weighted nose guide to ensure that the tube lies in water at the bottom of the gas main.

The assembly is inserted into the gas main through a tap hole using an insertion guide. The insertion guide is helpful to ensure that the tube is inserted at a proper angle into the gas main. In particular, if the tube is inserted at an angle too steep with respect to the main, the tube will not smoothly enter the main.

The more important features of my invention have been outlined rather broadly in order that the detailed description that follows may better be understood, and in order that the contribution to the art may better be appreciated. There are, of course, additional features of the invention that will be described and which will form the subject of the claims appended hereto. Those skilled in the art will appreciate that the conception upon which this disclosure is based may readily be utilized as a basis for designing other structures for carrying out the several purposes of the invention. It is important, therefore, that the claims be regarded as including such equivalent constructions as do not depart from the spirit and scope of the invention.

DESCRIPTION OF THE DRAWINGS

A specific embodiment of the invention has been chosen for purposes of illustration and description, and is shown in the accompanying drawings, forming a part of the specification.

FIG. 1 is a cross-sectional view of the forward end of an embodiment of the invention.

FIG. 2 is a cross-sectional view showing details of coupling between successive tubes.

FIG. 3 is a cross-sectional view showing details of coupling to a pump.

FIG. 4, comprising FIGS. 4A and 4B, is an elevational and transverse view, respectively, of the stiffener.

FIG. 5 is a schematic view of the operation of the embodiment shown in FIGS. 1 through 4.

FIG. 6 shows details of the insertion guide.

DESCRIPTION OF THE PREFERRED EMBODIMENT

Referring now to FIG. 1, it can be seen that the forward end of the preferred embodiment includes a generally cylindrical nose guide support 1. While the material that I have chosen for the nose guide support is brass, any material having sufficient weight and resistance to corrosion is equally acceptable. Brass is particularly appropriate when the invention is used in a gas main since brass tends to resist creating sparks. The forward end of nose guide support 1 has beveled surfaces 3 providing for more efficient suction of water within the main. A set of four holes 2 are formed at 90 degree intervals around the forward end of nose guide support 1 to accept spring 4. The spring prevents any larger debris within the gas main from being drawn into the tube and blocking the tube, while also presenting a rounded surface which allows the tube to progress smoothly within the gas main.

Tube adapter 5 is closely fitted within support 1. Adapter 5 is formed of a flexible vinyl which allows proper adhesion to tube 9, as will be described later.

Support 1 and adapter 5 are pierced with single hole 6, which accepts pin 7. The pin allows attachment of a swivel assembly 22, as will be described later. The support and the adapter are held as a single unit by friction and by the action of pin 7.

Adapter 5 expands at the end opposite support 1 to accept flexible tube 9. Any flexible material is usable, but I have found that an ethylene co-polymer, which is highly resistant to damage caused by the internal environment of a gas main is particularly preferable. Moreover, in addition to being highly flexible, an ethylene co-polymer provides a low-friction surface which allows the tube to be readily advanced within the gas main. Spherical ribs 10 are formed on the tube and engage with complementarily shaped ribs within the end of adapter 5. Of course, both sets of ribs may be in a continuous helix to allow adapter 5 to be screwed onto tube 9. The ribs 10 on tube 9 also prevent the tube from collapsing as water is pumped from within the gas main.

In addition to the engaging action of the ribs on tube 9 and adapter 5, tube 9 is adhered to the interior of adapter 5 using a cyanoacrylate adhesive. A tapered bead 8 of ethyl-type bostic is advantageously hot-melted around the circumference of the tube where it meets the adapter to insure a complete and high strength seal. The tapered bead also presents a tapered surface facilitating insertion and withdrawal of tube 9 from an insertion guide, as will be described later in connection with FIG. 6.

The tube is provided in convenient lengths of, for example, 50 or 100 feet. The manufacture of longer lengths of tube may be facilitated with the coupling shown in FIG. 2. As depicted in that figure, a pair of coupling adapter 11 are provided at opposite ends of tube length 12. Tube length 12 is affixed within the ends of adapters 11 in much the same manner as tube 9 into adapter 5. That is, complementary ribs within adapters 11 engage with the ribs on length 12, cyanoacrylate adhesive being applied to this junction. A tapered bead 13 of hot-melt adhesive assures a complete and high-strength seal and also provides a tapered surface, as previously described. A pair of tubes 9 is adhered to adapters 11 using, for example, cyanoacrylate.

The end of the tube opposite the nose guide is provided with a coupler adapted to couple the assembly to a water pump. As seen in FIG. 3, adapter 14 is adhered to tube 9, much the same as described for tube adapter 5. That is, adapter 14 is formed of a flexible vinyl material with engaging complementary ribs and adhered to tube 9 with a cyanoacrylate adhesive, a tapered bead 8 of ethyl-type bostic adhesive being hot-melted at the circumference of the tube where it meets the adapter to insure a complete and high-strength seal.

Pump connector 16 is inserted into adapter 14. Hole 17 is formed through both the adapter and the pump connector, and accepts pin 19. Pin 19 fixes stiffener 20 within the tube 9, as will be described below.

Since the adapter 14 is formed of a flexible vinyl, a ring clamp 15 is usable to affix adapter 14 to pump connector 16. The ring clamp is of a well-known worm drive assembly. Threads 18 of pump connector 16 permit connection to any number of conventional water pumps.

FIG. 4 shows details of stiffener 20. I have selected a flat stainless steel tape as the material for this stiffener although any suitably resilient material is acceptable. Stainless steel, as is generally known, is also highly resistant to corrosion and other adverse effects. As shown in FIG. 4A, one end of the tape 20 is formed into closed loop 21. This loop accepts pin 19, as shown in FIG. 3. The opposite end of tape 20 is inserted into the body 22 of a swivel. The swivel may be of the type manufactured by Gardner-Bender, Inc. of Milwaukee, Wis. The tape is folded back as shown at 24 in FIG. 4A. The swivel is subsequently withdrawn, but is kept in place at the end of tape 20 by fold back 24, as shown in FIG. 4B. End piece 23 is then threadedly inserted into body 22 of the swivel. The end piece 23 has hole 25 formed therein, which hole accepts pin 7 as shown in FIG. 1. Thus, stiffener 20 is positively supported in the interior of tube 9, yet the swivel allows tube 9 to rotate as it is inserted into the gas main.

FIG. 5 is a schematic view of the operation of water removal system. As shown in FIG. 5, tap hole 25 is formed at the exterior of gas main 29. Insertion guide 27 is fixed to the exterior of the gas main over tap hole 25. Putty, such as duct seal available from Johns-Mansville Corp., completes the seal between the tap hole and the insertion guide. The water removal assembly is inserted through the insertion guide into gas main 29, where it snakes through the gas main until the nose guide reaches water 26 at a low point in the main. The opposite end of the water removal system is affixed to pump 30, which draws water from the interior of the main.

FIG. 6 shows a cross-sectional view detailing the construction of the insertion guide. As shown in FIG. 6, the guide includes a base plate 31, the four corners of which are provided with knobs 32, two of which are shown. the knobs allow adjustment so that the insertion guide may be used with a variety of different gas mains, for example, gas mains of 4 or 6 inch diameter. At a central portion of the base plate 31, insertion tube 34 is placed. The tube is angled with respect to horizontal to provide the proper insertion angle and direction for the water removal system. Selection of the correct insertion angle A is important to assure proper operation of the water removal system. That is, if the tube is inserted at too great an angle, the tube will not be able properly to snake through the gas main. If the tube is inserted at too shallow an angle, an extremely large and potentially dangerous tap hole must be formed on the gas main. With the embodiment of my invention described above, I have found that an insertion angle of 68 degrees is particularly appropriate. However, an insertion angle within the range of approximately 45 degrees to 85 degrees is acceptable, although an angle within the range of approximately 60 degrees to 75 degrees is preferred.

At the lower end of the insertion tube 34 material is removed to form a bevel 35 which allows the water removal assembly to bend smoothly as it is propelled into the gas main. Alternatively, the lower end of tube 34 may be bent in the desired direction. The opposite end of insertion tube 34 flares into a frustum 36. The frustum provides a wide mouth for ease in inserting the water removal assembly. The mouth of the frustum is sealed with a flexible diaphragm 37 which prevents gas within the gas main from escaping. A hole 38, or alternatively a series of flaps, allows the water removal assembly to be inserted through the diaphragm and subsequently removed therefrom.

While the preferred embodiment of my invention, and indeed the best embodiment known to me, has been described, it should be understood that the invention should not be limited to any specific structure described above. Rather, the scope of the invention should be ascertained by reference to the following claims.

What I claim is:

1. A liquid removal apparatus for removing liquid from a container into which it has been inserted, said apparatus comprising:
   an elongate hollow flexible member for channelling the liquid as it is removed;
   stiffening means disposed within said flexible member for providing longitudinal rigidity to said flexible member, one end of said stiffening means being connected to one end of said flexible member; and
   a nose guide fixed to said one end of said flexible member, said nose guide including means for preventing debris from entering said flexible member.

2. An apparatus according to claim 1, wherein said flexible member includes a plurality of members providing said flexible member with radial rigidity.

3. An apparatus according to claim 1, wherein the other end of said flexible member is affixed to suction means.

4. An apparatus according to claim 1, wherein said flexible member has a low-friction surface.

5. An apparatus according to claim 1, wherein said flexible member is cylindrical.

6. An apparatus according to claim 1, wherein said nose guide includes means facilitating the propulsion of said flexible member through the container.

7. An apparatus according to claim 1, wherein said stiffening means is flat and is loosely confined within the hollow of said flexible member.

8. An apparatus according to claim 1, wherein said stiffening means includes a swivel permitting relative rotation of said flexible member and said stiffening means.

9. An apparatus according to claim 1, wherein said stiffening means includes a loop allowing connection of said stiffening means and said flexible member.

10. An apparatus according to claim 1, wherein both ends of said stiffening means are connected to respective ends of said flexible member.

11. A liquid removal apparatus for removing liquid from a container into which it has been inserted, said apparatus comprising:
    an elongate hollow flexible member for channelling the liquid as it is removed, one end of which is connectible to a source of suction;
    stiffening means disposed within said flexible member for providing longitudinal rigidity to said flexible member, one end of said stiffening means being connected to the other end of said flexible member; and
    a nose guide disposed at said other end of said flexible member for facilitating propelling said flexible member through the container, said nose guide including means for preventing debris from being drawn into said flexible member.

12. An apparatus according to claim 11, wherein said flexible member includes a plurality of members providing said flexible member with radial rigidity.

13. An apparatus according to claim 11, wherein said flexible member has a low-friction surface.

14. An apparatus according to claim 11, wherein said flexible member is cylindrical.

15. An apparatus according to claim 11, wherein said nose guide includes means for weighting said other end of said flexible member.

16. An apparatus according to claim 13, wherein said stiffening means is flat and is loosely confined within the hollow of said flexible member.

17. An apparatus according to claim 11, wherein said stiffening means includes a swivel permitting relative rotation of said flexible member and said stiffening means.

18. An apparatus according to claim 11, wherein said stiffening means includes a loop allowing connection of said stiffening means and said flexible member.

19. An apparatus according to claim 11, wherein both ends of said stiffening means are connected to respective ends of said flexible member.

20. An apparatus according to claim 11, further comprising an insertion guide for inserting the flexible member into the container.

21. An apparatus according to claim 20, wherein said insertion guide provides an insertion angle of between about 45 to 85 degrees.

22. An apparatus according to claim 20, wherein said insertion guide provides an insertion angle of between about 60 to 75 degrees.

23. An apparatus according to claim 20, wherein said insertion guide provides an insertion angle of about 68 degrees.

24. An apparatus according to claim 20, wherein said insertion guide includes means preventing contents of the container from escaping when said flexible member is inserted therethrough.

25. An apparatus according to claim 24, wherein said preventing means includes a diaphragm.

26. An apparatus according to claim 20, wherein said insertion guide includes adjusting means for adapting said insertion guide to the surface of said container.

27. An apparatus according to claim 20, wherein said insertion guide includes an inclined surface permitting said flexible member smoothly to transit said insertion guide into the container.

28. A liquid removal apparatus for removing liquid from a container, said apparatus comprising:
    a elongate hollow flexible member for channelling the liquid as it is removed, one end of said flexible member being connectible to a source of suction;
    stiffening means disposed at a central portion within said flexible member for providing longitudinal rigidity to said flexible member, said stiffening means including a swivel, the ends of said stiffening means being connected to the ends of said flexible member;
    a nose guide disposed at the end of said flexible member opposed to the end connectible to the source of suction, for facilitating propelling the flexible member through the container; and
    an insertion guide for permitting the flexible member to be inserted into the container.

29. An apparatus according to claim 28, wherein said flexible member includes a plurality of members providing said flexible member with radial rigidity.

30. An apparataus according to claim 28, wherein said flexible member has a low-friction surface.

31. An apparatus according to claim 28, wherein said flexible member is cylindrical.

32. An apparatus according to claim 28, wherein said nose guide includes means for weighting said other end of said flexible member.

33. An apparatus according to claim 28, wherein said nose guide includes means for preventing debris from being drawn into the flexible member.

34. An apparatus according to claim 28, wherein said stiffening means includes a loop allowing connection of said stiffening means and said flexible member with a pin inserted therethrough.

35. An apparatus according to claim 28, wherein said insertion guide includes means attachable to the container for providing an insertion angle of between about 45 and 85 degrees.

36. An apparatus according to claim 35, wherein said insertion guide provides an insertion angle of between about 60 to 75 degrees.

37. An apparatus according to claim 36, wherein said means attachable provides an insertion angle of about 68 degrees.

38. An apparatus according to claim 35, wherein said insertion guide includes means preventing contents of the container from escaping when said flexible member is inserted therethrough.

39. An apparatus according to claim 38, wherein said preventing means includes a diaphragm.

40. An apparatus according to claim 35, wherein said means attachable includes adjusting means for adapting said insertion guide to the surface of said container.

41. An apparatus according to claim 35, wherein said means attachable includes an inclined surface permitting said flexible member smoothly to transit said insertion guide into the container.

* * * * *

UNITED STATES PATENT AND TRADEMARK OFFICE
CERTIFICATE OF CORRECTION

PATENT NO. : 4,881,567

DATED : November 21, 1989

INVENTOR(S) : Gerald Rockower

It is certified that error appears in the above-identified patent and that said Letters Patent is hereby corrected as shown below:

On the title page:

FOREIGN PATENT DOCUMENTS, "482200  8/1977 United Kingdom" should read --1482200  8/1977 United Kingdom--.

COLUMN 3

Line 34, "coupling adapter 11" should read --coupling adapters 11--.

COLUMN 4

Line 31, "shown.  the" should read --shown.  The--.

COLUMN 6

Line 1, "claim 13," should read --claim 11,--.

COLUMN 7

Line 13, "means attachable" should read --insertion guide--.

UNITED STATES PATENT AND TRADEMARK OFFICE
CERTIFICATE OF CORRECTION

PATENT NO. : 4,881,567

DATED : November 21, 1989

INVENTOR(S) : GERALD ROCKOWER

It is certified that error appears in the above-identified patent and that said Letters Patent is hereby corrected as shown below:

COLUMN 8

Line 2, "insertion guide" should read --means attachable--.

Signed and Sealed this

Sixteenth Day of July, 1991

Attest:

HARRY F. MANBECK, JR.

*Attesting Officer*     *Commissioner of Patents and Trademarks*